United States Patent [19]

Matsukawa

[11] Patent Number: 4,758,713
[45] Date of Patent: Jul. 19, 1988

[54] BANKING TERMINAL EQUIPMENT

[75] Inventor: Makoto Matsukawa, Owariasahi, Japan

[73] Assignee: Hitachi, Ltd., Tokyo, Japan

[21] Appl. No.: 66,202

[22] Filed: Jun. 25, 1987

[30] Foreign Application Priority Data

Jun. 25, 1986 [JP] Japan .................................. 61-150246

[51] Int. Cl.$^4$ ............................................. G06F 15/30
[52] U.S. Cl. .................................................. 235/379
[58] Field of Search ......................................... 235/379

[56] References Cited

FOREIGN PATENT DOCUMENTS 59-146373  8/1984  Japan .

Primary Examiner—Harold I. Pitt
Attorney, Agent, or Firm—Antonelli, Terry & Wands

[57] ABSTRACT

A banking terminal equipment is provided for processing transaction slips such as the deposit/withdrawal slip used in a bank. The equipment comprises an optical read device for which the fields of the data recorded in the transaction slip required to be sent to the upper station are located at a first read position of the slip such that the data of the fields is displayed on a display screen during a read operation on the transaction slip by the optical read device. Thereafter, if an additional data is to be inputted, the data is entered and then the contents of the display are sent to the upper station when the slip processing end key is depressed. With such a construction, the time from when the transaction slip is installed in the read device to when the slip processing end key is depressed can be reduced and hence the processing efficiency of the overall system including the upper station can be improved.

4 Claims, 3 Drawing Sheets

BANKING TERMINAL EQUIPMENT

BACKGROUND OF THE INVENTION

The present invention relates to a banking terminal equipment for processing transaction forms and slips such as a deposit/withdrawal slip used in a bank.

As a method for processing the slips in a banking terminal equipment, there has been known a method as described, for example, in the JP-A-59-146373 in which a data of the slip is subjected to a work in a memory area after a slip read operation is completed.

According to the prior art technology mentioned above, after a slip or a sheet of transaction forms is completely read by an optical character reader (to be abbreviated as an OCR herebelow), all fields are collectively displayed on a display screen and then, a key-in operation is carried out, which therefore, leads to a problem that a considerably long period of time is required to process a transaction slip.

SUMMARY OF THE INVENTION

The present invention has been made on the situation described above to solve the problem. It is therefore, an object of the present invention to reduce the slip processing time, and to improve the processing efficiency of the overall system including a hierarchically upper station.

In order to achieve the above object there is provided a banking terminal equipment connected to an upper station in which there is provided optical read means for a slip having at a first read position a particular data portion among data recorded on the transaction slip, the particular data portion being required to be subjected to a transmission to the upper station, the data portion is displayed on display means during the operation to read the slip, and thereby overlapping the slip read operation thereafter with the key-in operation.

BRIEF DESCRIPTION OF THE DRAWINGS

The present invention will be apparent from the following detailed description taken in conjunction with the accompanying drawings in which.

DESCRIPTION OF THE PREFERRED EMBODIMENT

Figure 1:
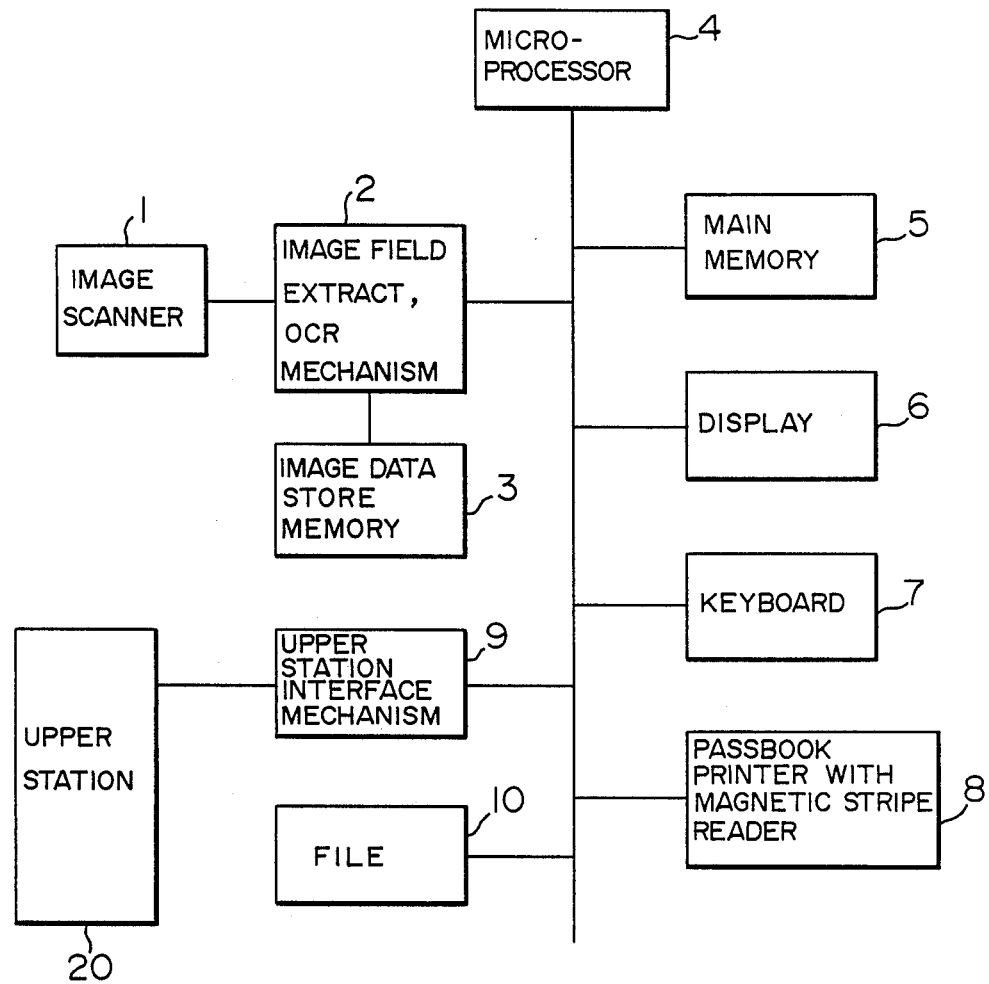
FIG. 1 is a schematic block diagram illustrating a configuration of a banking terminal equipment as an embodiment of the present invention.

Referring now to the drawings, a description will be given in detail of an embodiment of the present invention.

FIG. 1 shows a block configuration diagram of a banking terminal equipment. In this Figure, the equipment comprises an image scanner 1, an image field extract/character recognize mechanism 2, an image data store memory 3, a microprocessor 4, a main memory 5, a display 6, a keyboard 7, a passbook printer 8 with a magnetic stripe reader, an upper station interface mechanism 9, and an upper station 20.

The banking terminal equipment operates as follows.

An image data read by the image scanner 1 is passed through the image field extract/character recognize mechanism 2 so as to be stored in the image data store memory 3. The iamge field extract/character recognize mechanism 2 continuously monitors the image data store memory 3. When a field of image data is stored in the image data store memory 3, the image extract/character recognize mechanism 2 sequentially extracts an image field, effects a character recognition, and displays a result of the recognition at a specified position of the display 6.

The microprocessor 4 and the main memory 5 constitute a control section controlling the entire system of the equipment.

Figure 2:
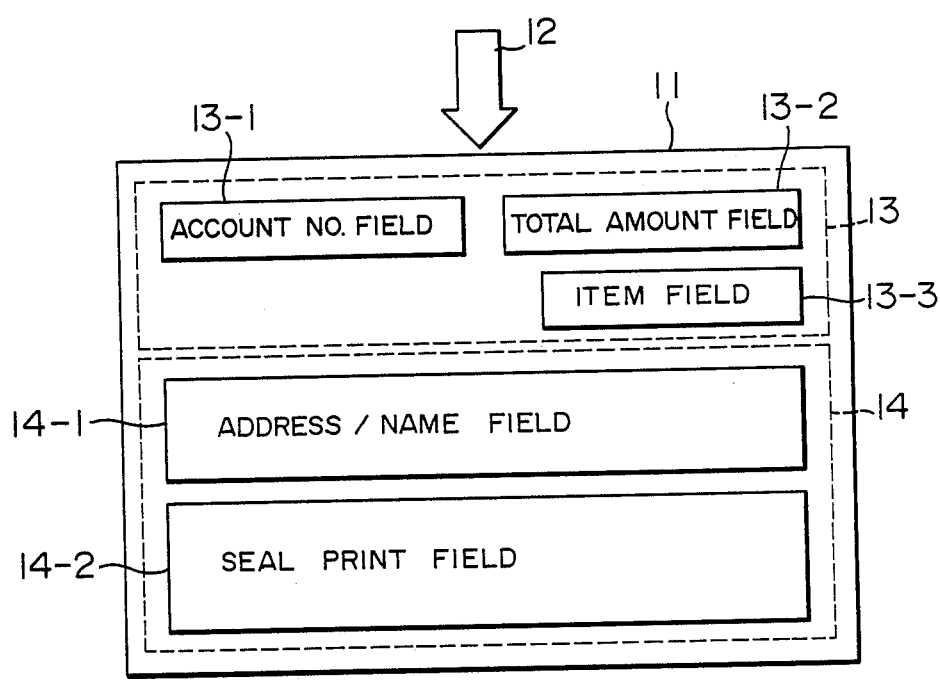
FIG. 2 is a schematic diagram illustrating a format of a payment/receive slip used for the banking terminal equipment of FIG. 1.

FIG. 2 shows a format of a deposit/withdrawal slip used for the banking terminal equipment of FIG. 1. In the Figure, a slip 11 having a read direction 12 of the image scanner 1 includes a group of fields 13 required to be subjected to a data transmission to the upper station 20, and a group of fields 14 for which the data transmission to the upper station 20 is not required.

The group of fields 13 comprises an account number field 13-1, a total amount field 13-2, and an item field 13-3; whereas the group of fields 14 includes an address/name field 14-1 and a seal print field 14-2.

The banking terminal equipment of FIG. 1 first reads and recognizes the account number field 13-1, a total amount field 13-2, and an item field 13-3, displays the respective data items on the display 6, and then sets the system to a state in which a key-in operation from the keyboard 7 is enabled. If there exists a data item to be further inputted in this situation, the terminal equipment receives the data item as an input thereto; otherwise, the display contents are sent to the upper station when the slip processing end key is depressed.

The address/name field 14-1 and the seal print field 14-2 in the group of fields 14 following the account number field 13-1, the total amount field 13-2, and the item field 13-3 are saved as a journal in the file 10 so as to be used, for example, to achieve a collation of the transactions after the on-line job is finished. In this operation, for the address/name field 14-1, the result of the character recognition is stored in the file, whereas, for the seal print field 14-2, the image data is directly stored in the file 10.

Figure 3:
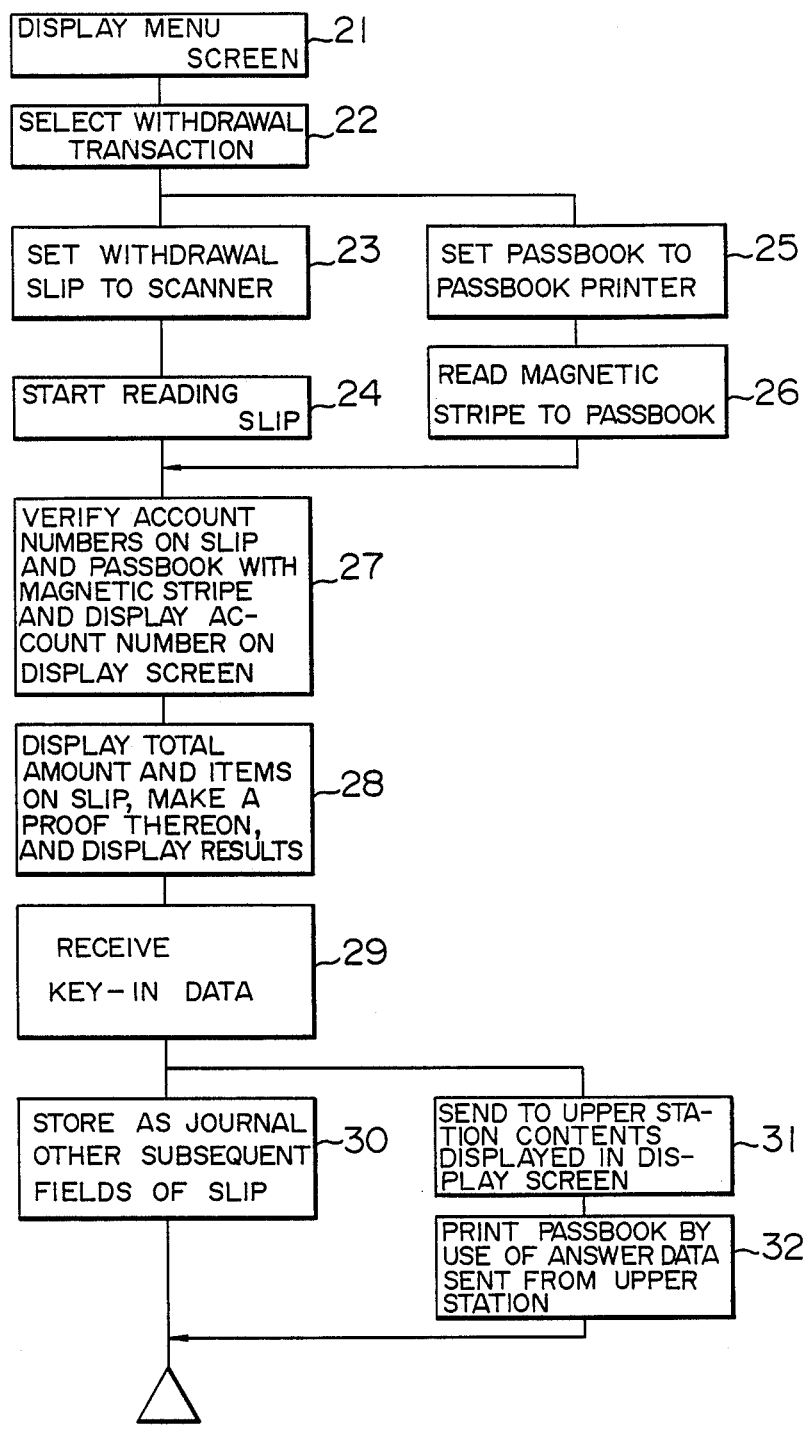
FIG. 3 is a flow chart illustrating operations of a payment job or a withdrawal processing in the banking terminal equipment of FIG. 1.

FIG. 3 shows an example of a flow chart illustrating a withdrawal job on the banking terminal equipment of FIG. 1. The operation of the equipment will be described in detail based on the flow chart example.

The equipment first displays a transaction menu on a screen (step 21). When the operator selects the withdrawal transaction (step 22) and installs the withdrawal slip 11 in the image scanner 1 (step 23), the terminal equipment starts reading the slip (step 24). In concurrence therewith, when a passbook is installed in the passbook reader with magnetic stripe reader 8 (step 25), the equipment reads the magnetic stripe of the passbook (step 26).

Next, the account numbers respectively read from the slip and the magnetic stripe of the passbook are verified or collated. If these account numbers match with each other, the account number is displayed on the display 6 (step 27). Thereafter, the total amount 13-2 and the item 13-3 read from the slip 11 are displayed on the display 6 and are subjected to a proof, and then the result is displayed on the display 6 (step 28).

After the operations to display data in the steps 27–28 are started, the terminal equipment accepts a key-in data of the operator from the keyboard 7 (step 29). At this point, the system effects a check on the data read from the slip to determine characters not read and characters erroneously read, thereby enabling a correction of the data and an additional input.

Next, the terminal equipment stores in the file 10 the address/name and the seal print read from the group of fields 14 located at the read position of the slip so as to obtain a journal (step 30). Concurrently, if the slip processing end key is depressed, the contents of the display on the display 6 are sent to the upper station 20 (step 31), receives an answer data from the upper station 20, and prints the passbook (step 32).

According to the banking terminal equipment described above, the processing time from when a slip is installed in the image scanner 1 to when the slip processing and key is depressed can be greatly reduced.

As described above, according to the present invention, the data portion required to be subjected to a data transmission to an upper station is located at a first read position of a slip so as to be displayed on the display screen during an operation to read the slip, so that the slip read operation thereafter and the key-in operation are overlapped, which leads to a remarkable effect that the slip processing time is minimized and the processing efficiency of the overall system including the upper station is improved.

While the present invention has been described with reference to the particular embodiment, it is not restricted by the embodiment but only by the appended claims. It is to be appreciated that those skilled in the art can change and modify the embodiment without departing from the scope and spirit of the invention.

I claim:

1. A banking terminal equipment connected to an upper station for processing a transaction slip including data input means for inputting data by use of keys and means for displaying data comprising:

means for optically reading a transaction slip on which a first data portion required to be transmitted to the upper station and a second data portion not required to be transmitted to the upper station are recorded, said first data portion being formatted to be located at a first position of said slip with respect to a read direction;

control means operative upon completion of a read operation on said first data portion by said optical read means, for displaying the data read from the first data portion on the data display means independently from completion of a read operation on the second data portion; and means responsive to a key-in operation from the data input means for transmitting to the upper station the data displayed on the data display means.

2. A banking terminal equipment according to claim 1 further including a file in which the data read from the second data portion by the optical read means is stored as a journal.

3. A banking terminal equipment according to claim 1 further including means for reading data recorded on a magnetic stripe disposed in a passbook wherein said control means comprises means for comparing the data read from the first data portion by the optical read means with the data read by the magnetic stripe read means and for displaying the data on the data display means when the data read by the optical read means matches with the data read by the magnetic stripe read means.

4. A banking terminal equipment according to claim 1 further comprising means for effecting a proof on the data read from the first data portion by the optical read means without waiting for completion of the read operation of the second data portion.

* * * * *